United States Patent
Carbonell Duque et al.

(10) Patent No.: US 8,929,861 B2
(45) Date of Patent: Jan. 6, 2015

(54) PERSONNEL ACCESS SYSTEM WITH VERIFICATION FEATURES UTILIZING NEAR FIELD COMMUNICATION (NFC) AND RELATED METHODS

(75) Inventors: Santiago Carbonell Duque, Bogota (CO); Alberto Daniel Zubiri, Richmond Hill (CA); Tomasz Buozek, Oakville (CA)

(73) Assignee: BlackBerry Limited, Waterloo, Ontario (CA)

(*) Notice: Subject to any disclaimer, the term of this patent is extended or adjusted under 35 U.S.C. 154(b) by 657 days.

(21) Appl. No.: 13/034,059

(22) Filed: Feb. 24, 2011

(65) Prior Publication Data
US 2012/0220216 A1    Aug. 30, 2012

(51) Int. Cl.
H04M 1/66 (2006.01)
H04L 29/06 (2006.01)
H04M 3/38 (2006.01)
H04W 12/06 (2009.01)

(52) U.S. Cl.
CPC ............. *H04L 63/0492* (2013.01); *H04M 3/38* (2013.01); *H04W 12/06* (2013.01); *H04L 63/18* (2013.01); *H04M 2250/04* (2013.01)
USPC ........... 455/411; 455/26.1; 455/405; 380/247

(58) Field of Classification Search
USPC ......................... 455/26.1, 405, 411; 370/95.1; 380/247–250
See application file for complete search history.

(56) References Cited

U.S. PATENT DOCUMENTS

| | | | |
|---|---|---|---|
| 5,257,397 A * | 10/1993 | Barzegar et al. ........... 455/553.1 |
| 2006/0112424 A1 | 5/2006 | Coley et al. |
| 2007/0118891 A1 | 5/2007 | Buer ................................. 726/8 |
| 2007/0123215 A1* | 5/2007 | Wang et al. .................... 455/411 |
| 2007/0190937 A1 | 8/2007 | Takayama .................... 455/41.1 |
| 2007/0197261 A1 | 8/2007 | Humbel ........................ 455/558 |
| 2009/0023476 A1 | 1/2009 | Saarisalo et al. .............. 455/561 |

(Continued)

FOREIGN PATENT DOCUMENTS

| | | | | |
|---|---|---|---|---|
| EP | 1912339 | 7/2006 | ............... H04B 1/59 |
| WO | 01/63425 | 8/2001 | .............. G06F 13/14 |

(Continued)

OTHER PUBLICATIONS

U.S. Appl. No. 12/888,599, filed Sep. 23, 2010, Fyke et al.

(Continued)

*Primary Examiner* — Edward Urban
*Assistant Examiner* — Max Mathew
(74) *Attorney, Agent, or Firm* — Allen, Dyer, Doppelt, Milbrath & Gilchrist, P.A.

(57) ABSTRACT

A personnel access system may include a mobile device(s) comprising a first near field communication (NFC) device, a wireless device, and a first controller configured to generate an access request. An access control device may be associated with a personnel access position and include a second NFC device configured to receive the access request, and a second controller configured to generate a verification request for the mobile device(s) based upon the received access request. A verification device may be configured to receive the verification request from the access control device, and send a verification message to the mobile device(s). The first controller may be configured to receive the verification message via the wireless device, and generate verification data based thereon. The second controller may be configured to selectively grant personnel access based upon the verification data.

16 Claims, 4 Drawing Sheets

(56) References Cited

U.S. PATENT DOCUMENTS

| 2009/0066476 | A1 | 3/2009 | Raheman | 340/5.64 |
|---|---|---|---|---|
| 2009/0132624 | A1 | 5/2009 | Haselsteiner et al. | 708/255 |
| 2009/0222659 | A1 | 9/2009 | Miyabayashi et al. | 713/156 |
| 2009/0324025 | A1 | 12/2009 | Camp, Jr. et al. | |

FOREIGN PATENT DOCUMENTS

| WO | 2007/126375 | 11/2007 | G07C 9/00 |
|---|---|---|---|
| WO | 2008042302 | 4/2008 | |
| WO | 2010093499 | 8/2010 | |

OTHER PUBLICATIONS

NFC mobile phones replace hotel room keys in Sweden http://www.hospitalitynet.org/news/4048931.search?query=nfc+mobile+phones+replace+hotel+room+keys+in+sweden Nov. 3, 2010.

Patron-Pro: NVC Access System: http://www.patronpro.cz/en/ printed Feb. 23, 2011.

Vingcard "*Signature RFID' by VingCard + NFC-Compatible Cell Phones Awarded 'Best Innovation in the Technologies & Networks Category' at Equip Hotel in Paris*" Nov. 6, 2006: www.vingcard.com.

"Cell Phones Replace Conventional Entry Tickets . . . and More" Parking Today Articles, Jun. 2006: www.parkingtoday.com (abstract only).

Magnussen, et al "*Security in NFC with WPS as a use case*" University of Agder, Grimstad, Norway Jun. 2008.

"*Radio Frequency Identification (RFID) Systems*" Internet article on epic.org/ publication date unknown, http://epic.org/privacy/rfid/.

Moore "*RFID: You've Got to Hand It to Consumers*" Internet article on aimglobal.org, Jun. 21, 2007, http://www.aimglobal.org/members/news/templates/template.aspx?articleid=2634&zoneid=24.

"*No escaping RFID: Infiltrating every mobile phone by 2010?*" Internet article on Gadgetell.com, Jun. 25, 2009, http://www.gadgetell.com/tech/comment/no-escaping-rfidinfiltrate-every-mobile-phone-by-2010/.

NFC http://www.phonescoop.com/glossary/term.php?gid=307: Print date Oct. 8, 2010.

Antoniou et al. Using RFID-based "Touch" for Intuitive User Interaction with Smart Space Security http://www.springerlink.com/content/u7476t2u1y1443m2/ (Abstract Only) Print date Oct. 8, 2010.

Bluetooth http:tinyurl.com/ybc6e3q: Print date Oct. 8, 2010.

Strommer et al. "Ultra-low Power Sensors with Near Field Communication for Mobile Applications" http://www.springerlink.com/content/K82516671000605w/: Print date Oct. 8, 2010 (abstract only).

Wireless Dynamics' new iCarte attaches to the bottom of the iPhone and turns the iPhone into an NFC phone as well as an RFID Reader/Writer. http://www.infosyncworld.com/news/n/10659.html: Print date Oct. 8, 2010.

* cited by examiner

PERSONNEL ACCESS SYSTEM WITH VERIFICATION FEATURES UTILIZING NEAR FIELD COMMUNICATION (NFC) AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
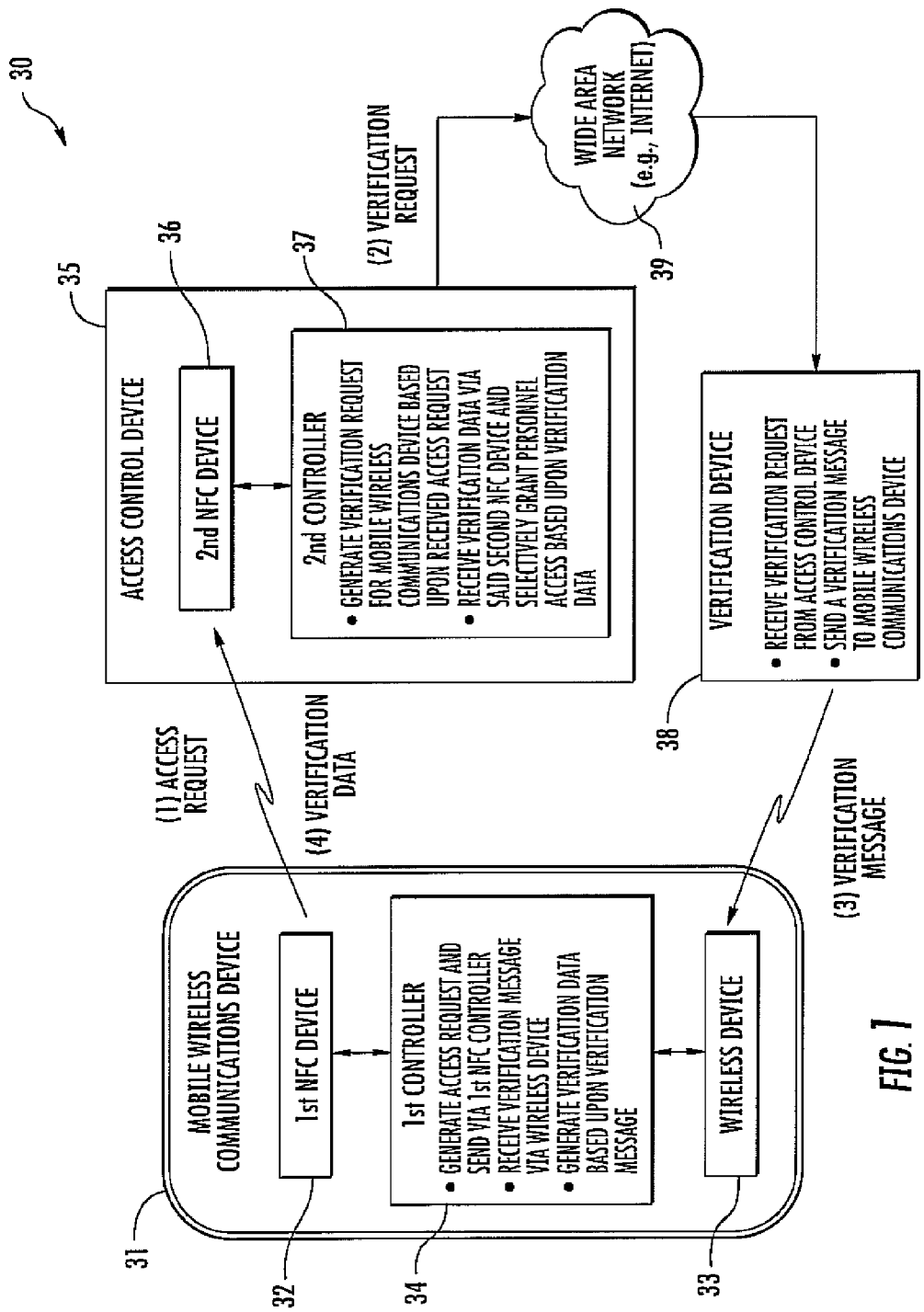
FIG. 1 is a schematic block diagram of a personnel access system in accordance with an example embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a personnel access system is disclosed herein which may include at least one mobile wireless communications device comprising a first near field communication (NFC) device, a wireless device, and a first controller coupled with the first NFC device and the wireless device and configured to generate an access request. The system may further include an access control device associated with a personnel access position and comprising a second NFC device configured to receive the access request from the first NFC device based upon proximity therewith, and a second controller coupled with the second NFC device and configured to generate a verification request for the at least one mobile wireless communications device based upon the received access request. The system may also include a verification device configured to receive the verification request from the access control device and, based thereon, send a verification message to the at least one mobile wireless communications device. More particularly, the first controller may be further configured to receive the verification message via the wireless device and, based thereon, generate verification data. Also, the second controller may be further configured to selectively grant personnel access based upon the verification data. Accordingly, the system may advantageously provide an enhanced level of security for providing personnel access based upon NFC.

The at least one mobile wireless communications device may have a unique identification (UID) associated therewith, and the verification device may be configured to send the verification message to the at least one mobile wireless communications device based upon the UID. The first controller may be configured to send the verification data to the access control device via the first NFC device. By way of example, the verification message may comprise an electronic mail (email) message, a peer-to-peer message, or a short message service (SMS) message, etc.

Additionally, the at least one mobile wireless communications device may further comprise an input device coupled to the first controller, and the first controller may be further configured to generate the verification data based upon the input device and the message data. The first controller may be further configured to receive a password via the input device and send the verification data to the access control device. By way of example, the input device may comprise a keypad, a biometric sensor, an optical sensor, etc. Also by way of example, the wireless device may comprise a cellular receiver. Furthermore, the second controller may be configured to send the verification request to the verification device via a wide area network.

A related mobile wireless communications device, and a related access control device, such as those described briefly above, are also provided. In addition, a related personnel access method may include generating an access request with at least one mobile wireless communications device, sending the access request from the at least one mobile wireless communications device to an access control device via near field communication (NFC) based upon proximity therewith, and sending a verification request for the at least one mobile wireless communications device from the access control device to a verification device based upon the received access request. The method may further include sending a verification message from the verification device to the at least one mobile wireless communications device based upon the verification request, generating verification data at the at least one mobile wireless communications device based upon the verification message, and selectively granting personnel access with the access control device based upon the verification data.

A related computer-readable medium may have computer-executable instructions for causing a mobile wireless communications device comprising an NFC device and a wireless device to perform steps comprising generating and communicating an access request to an access control device associated with a personnel access position via the NFC device, where the access control device is configured to generate a verification request for the at least one mobile wireless communications device based upon the access request and communicate the verification request to a verification device. The steps may further include receiving a verification message from the verification device via the wireless device, where the verification message is generated based upon the verification request, and generating verification data based upon the received verification message for causing the access control device to selectively grant personnel access.

Figure 2:
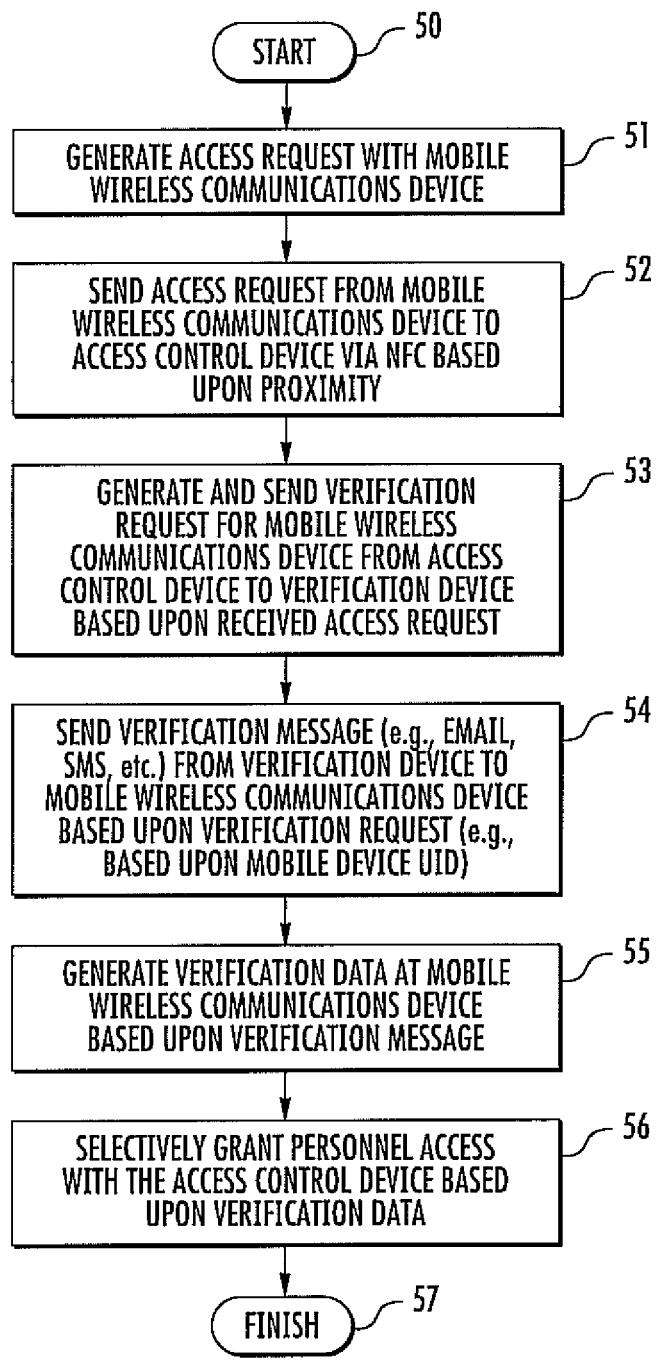
FIG. 2 is a flow diagram illustrating method aspects associated with the system of FIG. 1.
Figure 3:
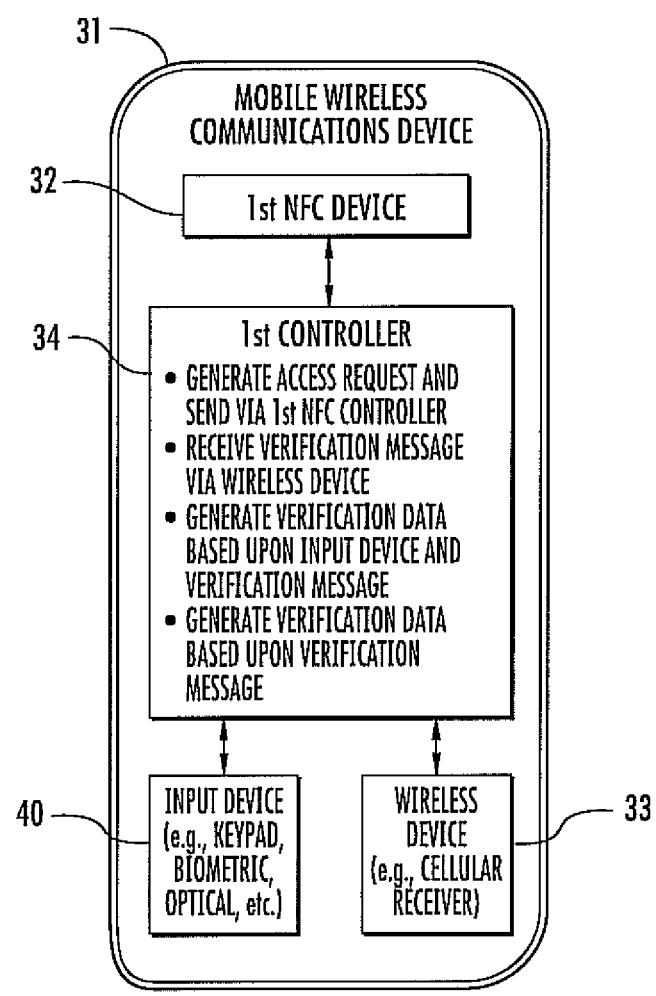
FIG. 3 is a schematic block diagram of an example embodiment of the mobile wireless communications device of FIG. 1 shown in greater detail.

Referring initially to FIGS. 1 through 3, an example personnel access system 30 and related method aspects are first described. The system 30 illustratively includes one or more mobile wireless communications devices 31, which are also referred to as "mobile devices" herein. By way of example, mobile devices such as portable or personal media players (e.g., music or MP3 players, video players, etc.), portable gaming devices, portable or mobile telephones, smartphones, tablet computers, electronic readers ("e-readers"), etc., may be used, although other suitable types of mobile devices may also be used in various embodiments.

The mobile device 31 illustratively includes a first near field communication (NFC) device 32, a wireless device 33, and a first controller 34 coupled to the first NFC device 32 and the wireless device 33. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

In the example of FIG. 3, the wireless device 33 is a cellular device (e.g., a cellular receiver or transceiver). However, it will be appreciated that other wireless communications formats may also be used, such as Bluetooth, WiFi, WiMAX, etc., for example. The first controller 34 may be implemented using a combination of hardware (e.g., processor, memory, etc.) and software (e.g., a computer-readable medium having computer-executable instructions), for example, to perform the various operations or functions described herein.

Now referring to FIG. 2, beginning at Block 50, the first controller 34 is configured to generate an access request, at Block 51. More particularly, the first controller 34 may be configured to cooperate with the first NFC device 32 to communicate or send the access request to an access control device 35 via NFC, at Block 52. The access control device 35 is associated with a personnel access position. By way of example, the personnel access position may correspond to a security door which is locked to prevent unauthorized access to a particular physical area. In other example embodiments, however, the personnel access position may correspond to a security gate or turnstile, or to a secure object such as a safe, locker, or a vehicle, for example.

The access control device 35 illustratively includes a second NFC device 36 and a second controller 37 coupled to the second NFC device 36. It should be noted that these components may be co-located or separately located in different embodiments. For example, the second NFC device 36 may be located at the personnel access position, and the second controller 37 may be co-located with the second NFC device 36 or remotely connected thereto, such as over a local area network (LAN), wireless communications link, the Internet, etc. The second controller 37 may also be implemented using hardware and software components, for example.

The second NFC device 36 is configured to communicate with the first NFC device 32 based upon proximity therewith, as described above, to receive the access request. For example, when the mobile device 31 is swiped or bumped with the second NFC device 36, NFC communications are established between the first NFC device 32 and second NFC device 36, and the access request is communicated or sent via NFC to the second NFC device 36. By way of example, the mobile device 31 may have a unique identification (UID) associated therewith, and the access request may include the UID to identify the given mobile device (and, therefore, a user associated with the mobile device) that is attempting to obtain access.

Rather than merely checking to see if the UID (or other identifier) of the mobile device 31 is on an approved mobile device security list, for example, the access control device 35 advantageously initiates additional security measures to verify whether personnel access should be granted. For example, in some cases the mobile device 31 may be lost or stolen from its rightful owner, in which case someone else may attempt to surreptitiously gain access via the access control device 35 using the mobile device. If the access control device 35 were to end its security check after determining that the mobile device 31 (which is associated with an authorized user) is on an approved mobile device security list, then an unauthorized person would be granted access merely by possessing the mobile device of the authorized user.

However, the second controller 37 is advantageously configured to generate a verification request for the mobile device 31 based upon the received access request, and send the verification request to a verification device 38, at Block 53. By way of example, the verification request may include the UID of the mobile device 31, or other data that identifies the given mobile device to the verification device 38. For example, the verification device 38 may comprise a server that is remotely located from the access control device 35 and communicates with the access control device via a network, such as a wide area network 39 (e.g., the Internet). However, in some embodiments the verification device 38 may be co-located with the access control device 35, i.e., "on-site" adjacent the personnel access position, and they may communicate via a LAN, wireless link, etc. Moreover, other suitable verification devices than a server may be used in some applications.

The verification device 38 is configured to receive the verification request from the access control device 35 and, based thereon, send a verification message to the mobile device 31, at Block 54. By way of example, the verification message may comprise an electronic mail (email) message, short message service (SMS) message, peer-to-peer message, etc. That is, the message is directed to a unique address (e.g., the UID) associated with the mobile device 31, which in the case of an email the UID comprises an email address, and in the case of an SMS message the UID comprises a telephone number. However, other UIDs may also be used, such as an IMEI number, a PIN number, etc.

The first controller 34 is further configured to receive the verification message via the wireless device 33 and, based thereon, send verification data to the access control device 35, such as via the first NFC device 32 (although this may also be done via the wireless device 33 and the verification device 38 in some example embodiments) at Block 55. In accordance with one example, the verification data may be included in the verification message. That is, an alphanumeric verification sequence, etc., may be included in the message to pass along to the access control device 35. By way of example, the verification data may comprise a pseudorandom data, may be single or one-time use data, a rolling PIN code, expire after a certain duration, etc.

The verification data may be made available to provide to the access control device 35 upon opening of the verification message on the mobile device 31, for example. Because access to messages received on the mobile device 31 may be restricted (e.g., through password protection, etc.), this may advantageously be used to verify that the proper user of the mobile device 31 does indeed have it in his possession. That is, simply having possession of the mobile device 31 would not be sufficient to gain access to the physical location controlled by the access control device 35. Rather, one would also have to have access to the email, SMS message, etc., that will be addressed and sent directly to the address, phone number, etc., known to be associated with the intended recipient and user of the mobile device 31. For example, a password or other factor of authentication may need to be entered via the input device 40 to switch the mobile device 31 from a locked state into an unlocked state in which the verification message may be viewed or used. In one example use case, a user may enter a device password to obtain access to an access code that the verification device 38 sends to the mobile device 31.

In accordance with another example, the mobile device 31 may further include one or more input devices 40 (FIG. 3), and the verification data may be generated also based upon input from the input device 40. In one example, input device 40 comprises a keypad. To generate proper verification data, the verification message may prompt a user to enter an alphanumeric verification sequence (e.g., a pseudorandom key, etc.) included in the message, for example. In another example, input device 40 comprises an audio input device (e.g., microphone), and the verification message may prompt a user to record a particular speech pattern, etc., to generate proper verification data. In yet another example, input device 40 comprises a biometric sensor (e.g., a fingerprint sensor), and the verification message may prompt the user for appropriate biometric input to generate the verification data. In still another example, input device 40 comprises an optical sensor (e.g., a digital camera), and the user may be prompted by the verification message to capture an image of something at the personnel access position for verification purposes (e.g., a bar code or QR code, etc.).

The second controller 37 may be further configured to receive the verification data generated or provided by the mobile device 31 via the second NFC device 36 (although in some embodiments verification data (e.g., PIN, etc.) may be provided at the access control device (e.g., via a keypad, etc.)), and selectively grant personnel access based thereon, at Block 56, which illustratively concludes the method of FIG. 2 (Block 57). That is, in addition to initially determining that the mobile device 31 is authorized for personnel access, which may be done prior to sending the verification request to the verification device 38, the access control device 35 also verifies that the correct verification data is provided by the mobile device 31, responsive to a verification message uniquely addressed to the mobile device 31, before providing personnel access. This advantageously helps ensure that the operator or user that has possession of the mobile device 31 is in fact the user assigned to or associated with the mobile device, and therefore authorized for gaining personnel access. The second controller 37 may verify the received verification data based upon previously stored information (e.g., by comparison to a reference fingerprint or voice print), or via communication with the verification device 38 (e.g., to retrieve the pseudorandom password sent to the mobile device 31 for comparison, etc.). In some example embodiments, the verification device 38 may perform the requisite verification or comparison operations (e.g., fingerprint comparison, voice print comparison, etc.).

Accordingly, the system 30 advantageously provides an additional layer of security for physical access control situations. For example, it may allow companies, governmental institutions, educational institutions, financial institutions, and other owners or tenants of real property, etc., to control after hours access to buildings and rooms with high value or sensitive equipment or information. In this regard, the additional verification performed by sending the verification to the verification device 38 may be selectively enabled, such as during particular times of the day (e.g., after-hours) when a personnel access position is not otherwise attended by a receptionist or security guard, for example. Such access control features may be set by a system administrator with access to the access control device 35 or the verification device 38, for example.

In accordance with one example implementation using the BlackBerry communications infrastructure from the present assignee Research in Motion Limited, the verification device 38 may be implemented using the BlackBerry Enterprise Server (BES). In this regard, a BlackBerry PIN message may be used as the verification message, for example. However, it will be noted that other suitable verification devices and verification message types may be used in difference embodiments.

Example components of a mobile wireless communications device 1000 that may be used in accordance with the above-described embodiments are further described below with reference to FIG. 4. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
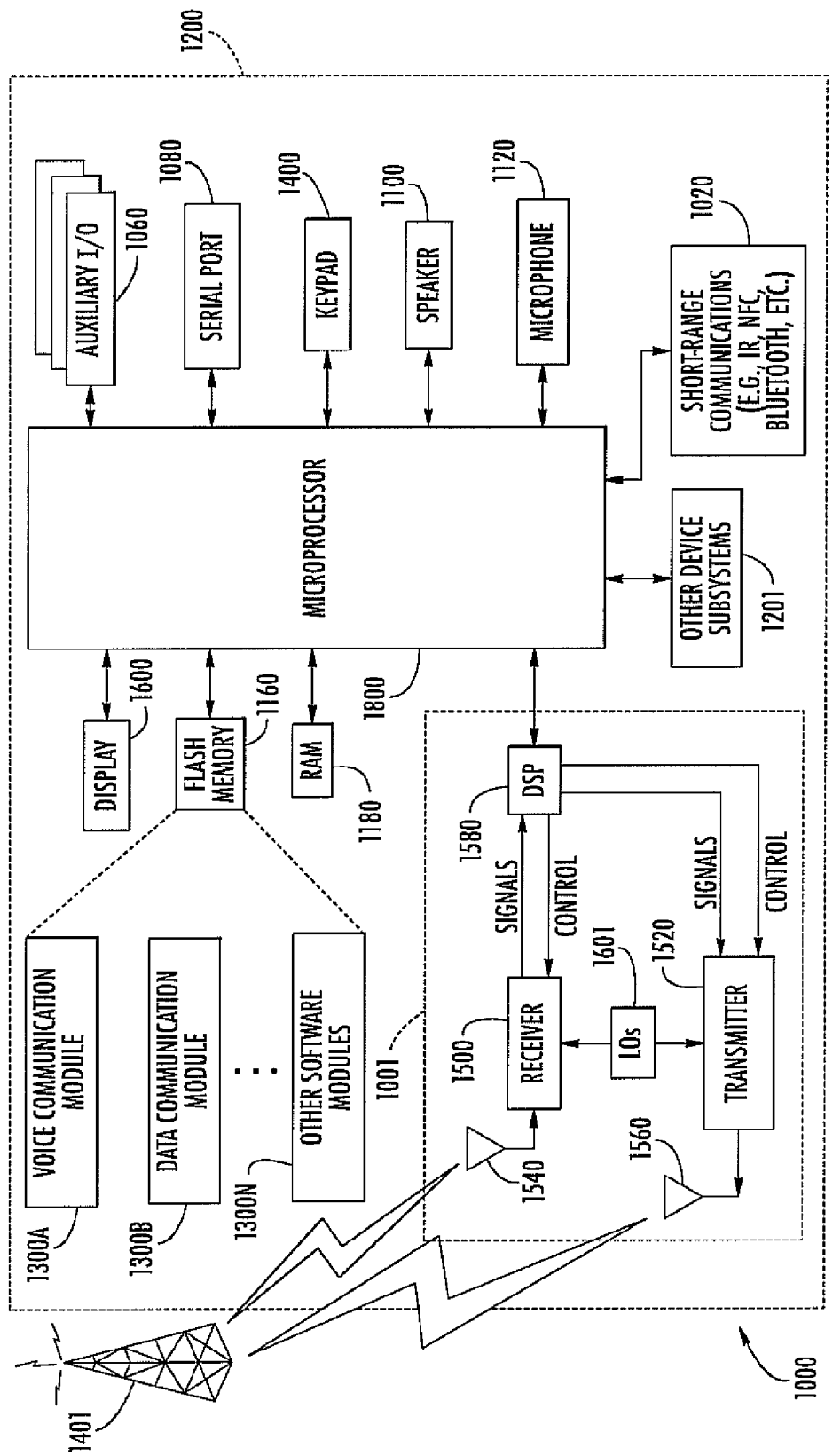
FIG. 4 is a schematic block diagram illustrating example components of a mobile wireless communications device that may be used with the devices of FIGS. 1 and 3.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A personnel access system comprising:
   at least one mobile wireless communications device comprising
      a first near field communication (NFC) device,
      a wireless device configured to communicate using a wireless communications format different than NFC, and
      a first controller coupled with said first NFC device and said wireless device, the first controller being configured to generate an access request;
   an access control device associated with a personnel access position, the access control device comprising
      a second NFC device configured to receive the access request from said first NFC device based upon proximity therewith, and
      a second controller coupled with said second NFC device, the second controller being configured to generate a verification request for the at least one mobile wireless communications device based upon the received access request; and
   a verification device configured to receive the verification request from said access control device and, based thereon, send a verification message to said at least one mobile wireless communications device;
   said first controller being further configured to receive the verification message via said wireless device and, based thereon, generate verification data;
   said second controller being further configured to selectively grant personnel access based upon the verification data.

2. The personnel access system of claim 1 wherein said at least one mobile wireless communications device has a unique identification (UID) associated therewith; and wherein said verification device is configured to send the verification message to said at least one mobile wireless communications device based upon the UID.

3. The personnel access system of claim 1 wherein said first controller is further configured to send the verification data to said access control device via said first NFC device.

4. The personnel access system of claim 1 wherein the verification message comprises at least one of an electronic mail (email) message, a peer-to-peer message, or a short message service (SMS) message.

5. The personnel access system of claim 1 wherein said at least one mobile wireless communications device further comprises an input device coupled to said first controller; and wherein said first controller is further configured to generate the verification data based upon said input device.

6. The personnel access system of claim 5 wherein said first controller is further configured to receive a password via the input device and send the verification data to said access control device based upon the password.

7. The personnel access system of claim 5 wherein said input device comprises at least one of a keypad, a biometric sensor or an optical sensor.

8. The personnel access system of claim 1 wherein said wireless device comprises a cellular receiver.

9. The personnel access system of claim 1 wherein said second controller is configured to send the verification request to said verification device via a wide area network.

10. A personnel access method for at least one mobile wireless communications device comprising:
   generating an access request with the at least one mobile wireless communications device comprising a near field communication (NFC) device and a wireless device configured to communicate using a wireless communications format different than NFC;
   sending the access request from the at least one mobile wireless communications device to an access control device via the NFC device based upon proximity therewith;
   receiving a verification message from the verification device at the at least one mobile wireless communications device via the wireless device, the verification message being based upon a verification request for the at least one mobile wireless communications device sent from the access control device to the verification device based upon the received access request; and
   generating verification data at the at least one mobile wireless communications device based upon the verification message;
   wherein personnel access is selectively granted based upon the verification data.

11. The method of claim 10 wherein the at least one mobile wireless communications device has a unique identification (UID) associated therewith; and wherein the verification message is sent to the at least one mobile wireless communications device based upon the UID.

12. The method of claim 10 further comprising sending the verification data from the at least one mobile wireless communications device to the access control device via NFC.

13. The method of claim 10 wherein the verification message comprises at least one of an electronic mail (email) message, a peer-to-peer message, or a short message service (SMS) message.

14. The method of claim 10 wherein the at least one mobile wireless communications device further comprises an input device; and further comprising generating the verification data based upon the input device.

15. The method of claim 10, wherein the at least one mobile wireless communications device further comprises an input device, the method further comprising receiving a password via the input device and sending the verification data to the access control device based upon the password.

16. The method of claim 10 wherein the verification request is sent from the access control device to the verification device via a wide area network.

* * * * *

UNITED STATES PATENT AND TRADEMARK OFFICE
CERTIFICATE OF CORRECTION

PATENT NO. : 8,929,861 B2
APPLICATION NO. : 13/034059
DATED : January 6, 2015
INVENTOR(S) : Santiago Carbonell Duque, Alberto Daniel Zubiri and Tomasz Buczek It is certified that error appears in the above-identified patent and that said Letters Patent is hereby corrected as shown below:

On the Title page:

In (75), Inventor Tomasz Buozek's name should be corrected to Tomasz Buczek

Signed and Sealed this
First Day of March, 2016

Michelle K. Lee
*Director of the United States Patent and Trademark Office*